July 29, 1924.
W. H. McALLISTER
CASTER SOCKET
Filed April 26, 1923    2 Sheets-Sheet 1
1,503,328
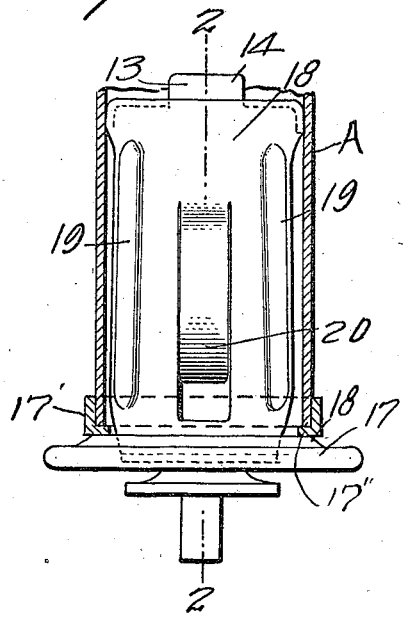
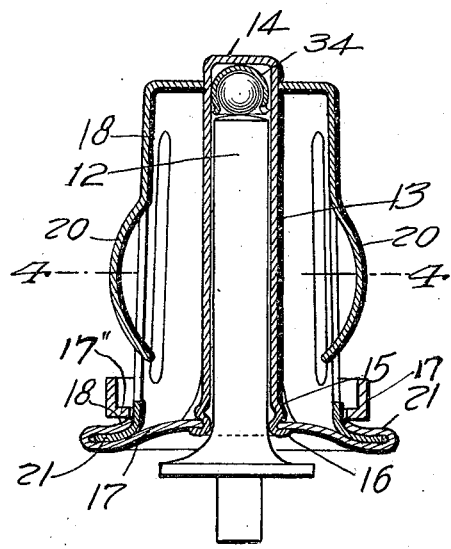
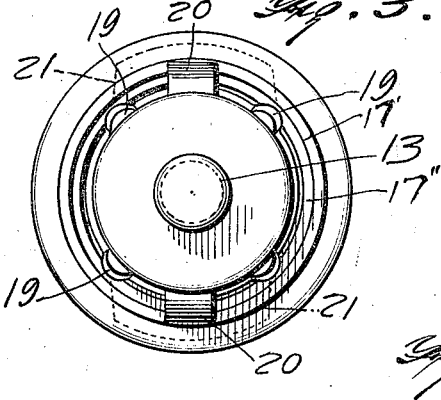
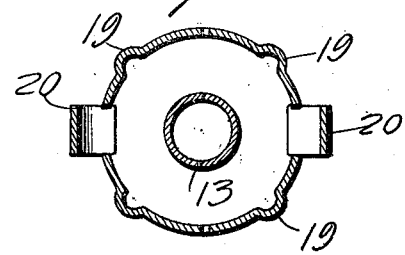
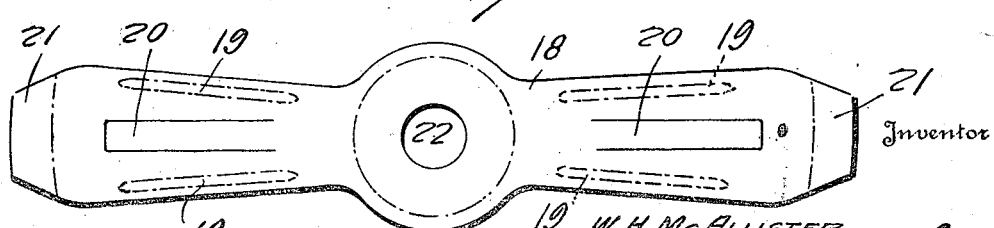
Inventor
W. H. McALLISTER,
By
Attorney July 29, 1924.
W. H. McALLISTER
CASTER SOCKET
Filed April 26, 1923   2 Sheets-Sheet 2
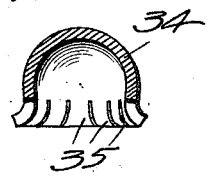
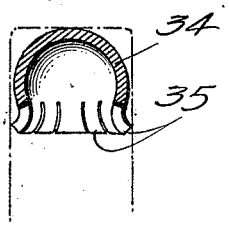
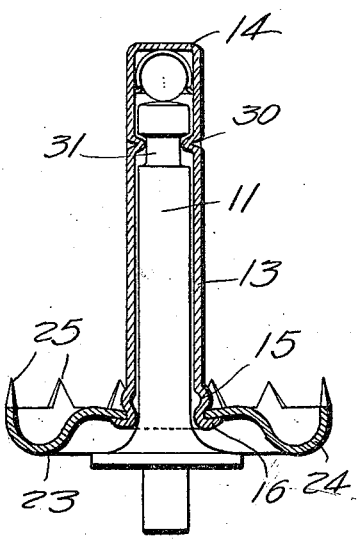
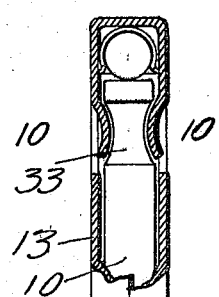
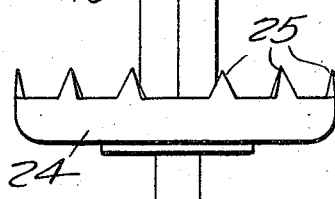
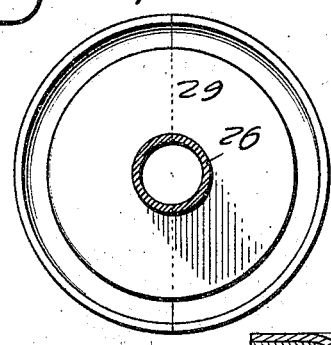
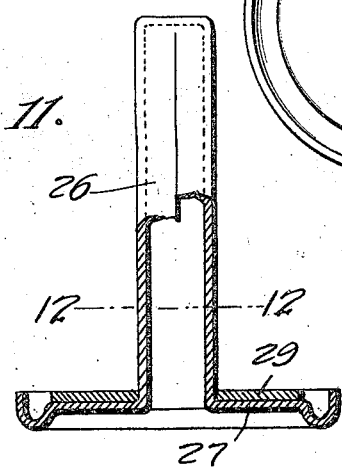
Inventor
W. H. McALLISTER,
By
Attorney Patented July 29, 1924.

1,503,328

UNITED STATES PATENT OFFICE.

WILLIAM H. McALLISTER, OF LINDEN, PENNSYLVANIA.

CASTER SOCKET.

Application filed April 26, 1923. Serial No. 634,722.

*To all whom it may concern:*

Be it known that I, WILLIAM H. McALLISTER, a citizen of the United States, residing at Linden, in the county of Lycoming and State of Pennsylvania, have invented certain new and useful Improvements in Caster Sockets, of which the following is a specification.

This invention relates to caster sockets and has for an object to provide new and improved features of economy in manufacturing and reliability in use.

A further object of the invention is to provide a caster socket adapted to receive a caster of the spindle type with new and improved means for retaining a ball in position to engage the end of the spindle for anti-friction purposes.

A further object of the invention is to provide a spindle receiving socket with a shell of improved type and style adapted to fit and be retained in a tubular member such as the leg of a metal bed.

With these and other objects in view, the invention comprises certain novel parts, elements, units, combinations and constructions as disclosed in the drawings, together with mechanical equivalents thereof, as will be hereinafter more fully described and claimed.

In the drawings:

Figure 1 is a view of the caster socket in side elevation, showing the housing also in side elevation for engagement in a metal bed or the like.

Figure 2 is a diametrical sectional view normally vertical through the type shown at Figure 1 and taken on line 2—2 of that figure.

Figure 3 is a top plan view of the type shown at Figures 1 and 2.

Figure 4 is a transverse sectional view taken on line 4—4 of Figure 2.

Figure 5 is a detail plan view of the blank from which the housing shown at Figures 1 and 4, inclusive, is constructed.

Figure 6 is a diametrical sectional view of the ball retainer before it has been closed into ball-retaining proportions.

Figure 7 is a diametrical sectional view of the ball-retainer closed to ball-retaining proportions, the ball being indicated in dotted lines in said figure.

Figure 8 is a diametrical sectional view through a slightly different modification of the invention.

Figure 9 is a view partly in side elevation and partly in diametrical section of a different embodiment of the invention.

Figure 10 is a transverse sectional view taken on line 10—10 of Figure 9.

Figure 11 is a view partly in side elevation and partly in section of a slightly different modification of the invention.

Figure 12 is a transverse sectional view taken on line 12—12 of Figure 11.

Figure 13 is a view partly in side elevation and partly in diametrical section of said different modification of the invention.

Like characters of reference indicate corresponding parts throughout the several views.

The improved caster socket which forms the subject-matter of this application is adapted to be associated with spindles of various types as, for instance, the spindles indicated conventionally at 10, 11 and 12, it being understood, however, that the invention is not limited in its application to spindles of any of these specific types but includes spindles of other types as well.

To embrace the spindle of either or any of the types employed, a tubular socket is provided, one embodiment being shown at 13, composed of stamped sheet metal folded at its upper end as at 14 and each half formed into a semi-cylindrical portion, the edges of which abut the juxtaposed section, forming a complete tube but with slits upon diametrically opposite sides.

This socket, 13, is attached to supporting devices of several types by forming a bead, 15, and flange, 16, between which is located a groove receiving the inner edge of some supporting device of general annular formation. As shown at Figures 1 and 2, this disc, 17, is inclined somewhat downwardly from its support upon the flange, 16, and its edge, 18, rolled over the edge of the casing. This casing is intended to fit and be retained in a tubular member as explained in the objects of invention, as, for instance, the leg of a metal bed, indicated at A, and is of such proportion as to be inserted in beds of standard sizes, provision being made to fit different standard sizes. The provision for fitting such different sizes consists of ribs, 19, stamped into the metal and outstanding from the circumference of the housing, as indicated more particularly at Figures 3 and 4. The housing, 18, is also preferably composed of sheet metal, a blank being shown at Figure 5 wherein as a preliminary step the ribs, 19, are struck up. Spring tongues, 20, are also similarly struck up or formed in this sheet metal, but are bowed outwardly from the lines of the housing as indicated at Figure 2, so that the housing becomes rigidly and permanently associated with the socket, 13, as so indicated. It is provided with an opening, 22, at its upper end, through which the upper end of the socket, 13, extends, so that the weight of the supported article does not bear upon the folded part, 14, of the socket, but is carried by a collar, 17', having an internal flange, 17", which bears upon the disc, 17, or the inturned flange, 21, and communicated to the socket by bearing upon the flange, 16. This collar, 17', is intended to fit rather snugly about the tube A and prevent splitting of the tubing which so often happens with inserted casters.

Instead of employing the socket, 13, in association with the housing, 18, however, it is in some instances provided with a supporting member for engaging into a wooden body, as, for instance, the leg of a table or the like. For this purpose, the disc, here indicated at 23, is associated with the socket member as is the disc, 17, and its outer periphery is rolled upwardly at 24 and terminates in points, 25, proportioned to penetrate the wood of the table leg or the like.

In some instances, it has been found desirable simply to attach the socket to the article by means of screws inserted through a disc. Under such conditions, it is not necessary to attach the parts together as shown at Figures 2 and 8, but the metal of the socket in this instance shown at Figures 11 and 13 and numbered 26 may be simply flanged outwardly to form a disc, 27, which may be reinforced by a washer, 28 or 29.

For the various types of spindles, 10, 11 and 12 or other spindles which may be employed, means are provided for retaining the spindle in the socket. At Figure 8, indentations, 30, are shown which engage in a constriction, 31, in the spindle. At Figure 9, spring fingers, 32, are provided which naturally will be stamped up at the same time the socket is die-stamped and will engage in the specific type of constriction indicated at 33 in said figure.

Whatever the type of spindle, and its co-acting retaining means, the upper end of the socket is provided with a ball-retainer, 34. This ball-retainer is shown in enlarged sectional detail at Figure 7 and in Figure 6 the same showing, but not closed to embrace the ball beyond its equator. This ball-retainer, by reason of the slit margin, 35, is frictionally retained in the upper end of the socket and also retains the ball in such position. It will be obvious that the ball may be placed in the retainer in its condition as shown at Figure 6 and then the ball and retainer forced into the socket closing the device down to the position shown at Figure 7, automatically retaining the retainer in position and the ball within the retainer.

I claim:

1. A caster socket comprising a tubular member having a groove at its lower end, a body-supporting centrally perforated plate, having its perforation engaged in the groove and means provided by the plate for engagement with a body to be supported.

2. A caster socket comprising a tubular member of sheet metal formed in conjoined semi-tubular sections having its lower end flanged and beaded to produce a circumferential groove, a body-supporting centrally perforated plate embracing the socket and seated in the groove and means carried by the plate for engagement with a body to be supported.

3. A caster socket comprising a tubular member composed of semi-cylindrical conjoined sections folded at their upper ends to form a closure for the tubular member, a spaced flange and bead at the lower end of the tubular member producing an interlying groove, a centrally perforated plate engaged in the groove and extending outwardly therefrom approximately in a plane perpendicular to the axis of the tubular member, a housing surrounding the tubular member and having its lower end flanged outwardly and engaged by the periphery of the plate, and yielding engaging means extending outwardly through the housing.

4. A caster socket comprising a tubular member composed of conjoined semi-cylindrical parts connected at their upper end by a section forming a closure for the tube, a bead flange formed adjacent the lower end of the tube producing an interlying groove, a centrally perforated plate engaged by the groove and extending outwardly in a direction generally perpendicular to the axis of the tubular member and having its outer periphery rolled and turned upwardly, a housing surrounding the tubular member and having its lower end flanged outwardly and enclosed and embraced by the roll of the plate, ribs formed longitudinally along the housing, spring retaining members underlying some of the ribs and bowed outwardly beyond the lines of the housing.

5. A caster socket comprising a tubular member and a friction reducing member inserted into the tubular member, comprising a ball-retainer contracted by its introduction into the tube and a ball positioned in the retainer having a spherical segment extending beyond the retainer.

6. A caster socket comprising a tubular member proportioned to receive a spindle of a caster and a ball-retainer in the upper end of said tubular member, said ball-retainer comprising a spherical segmental socket greater than half a sphere containing a ball, a spherical segment of which extends beyond the ball-retainer.

In testimony whereof I affix my signature.

WILLIAM H. McALLISTER.